(12) United States Patent
Perelli et al.

(10) Patent No.: US 11,300,240 B2
(45) Date of Patent: Apr. 12, 2022

(54) DISPLAY DEVICE STAND

(71) Applicant: Lenovo (Singapore) Pte. Ltd., Singapore (SG)

(72) Inventors: Thomas Perelli, Raleigh, NC (US); Madison Smith, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/734,368

(22) Filed: Jan. 5, 2020

(65) Prior Publication Data
US 2021/0207760 A1    Jul. 8, 2021

(51) Int. Cl.
*F16M 11/04*    (2006.01)
*G06F 1/16*    (2006.01)
*H02J 7/00*    (2006.01)

(52) U.S. Cl.
CPC ......... *F16M 11/046* (2013.01); *F16M 11/041* (2013.01); *G06F 1/1632* (2013.01); *H02J 7/0044* (2013.01)

(58) Field of Classification Search
CPC .. F16M 11/046; F16M 11/041; G06F 1/1632; H02J 7/0044
USPC ....... 248/676, 447, 448, 449, 451, 453, 459, 248/159, 174, 346.01, 346.5; 361/679.01, 361/679.02, 679.04, 679.21, 679.26, 361/679.27
See application file for complete search history.

(56) References Cited

U.S. PATENT DOCUMENTS

| | | | | |
|---|---|---|---|---|
| 5,104,086 A  * | 4/1992 | Ramey, III | ........... | A47B 21/045 248/442.2 |
| 8,308,113 B2 * | 11/2012 | Chen | ...................... | F16M 11/10 248/122.1 |
| 8,424,830 B2 * | 4/2013 | Yang | .................... | A47B 23/044 248/459 |
| 9,203,945 B2 * | 12/2015 | Chin | .................... | G06F 1/1626 |
| 9,946,308 B1 * | 4/2018 | Perelli | .................... | G06F 1/1647 |
| 10,001,242 B2 * | 6/2018 | van Hooft | .............. | F16M 11/38 |
| 10,868,900 B1 * | 12/2020 | Lindvall | ................ | F16M 11/38 |
| 2008/0024388 A1 * | 1/2008 | Bruce | ................... | G06F 1/1622 345/1.1 |
| 2010/0053876 A1 * | 3/2010 | Widmer | ................ | G06F 1/1632 361/679.27 |
| 2010/0214743 A1 * | 8/2010 | Huang | .................. | G06F 1/1616 361/692 |
| 2012/0312953 A1 * | 12/2012 | Moffa | .................. | A47B 23/044 248/459 |
| 2013/0070408 A1 * | 3/2013 | Shen | ..................... | G06F 1/1632 361/679.27 |
| 2013/0083257 A1 * | 4/2013 | Murakami | ............ | G06F 1/1635 348/839 |

(Continued)

*Primary Examiner* — Eret C McNichols
*Assistant Examiner* — Michael McDuffie
(74) *Attorney, Agent, or Firm* — Brian J. Pangrle

(57) ABSTRACT

A display device stand can include a base that includes a fore portion with an upwardly sloping top surface defined by a first angle, an extension with an upwardly sloping fore surface defined by a second angle that is less than the first angle, and an aft portion, where the fore portion includes a front edge, the aft portion includes a back edge and the extension includes a top side that define vertexes of an acute triangle; and an adjustable support that includes a retracted state with respect to the extension and an extended state with respect to the extension.

18 Claims, 13 Drawing Sheets

(56) References Cited

U.S. PATENT DOCUMENTS

| | | | |
|---|---|---|---|
| 2013/0128432 A1* | 5/2013 | Lee | G06F 1/1626 361/679.01 |
| 2014/0116299 A1* | 5/2014 | Salehi | A47B 41/06 108/32 |
| 2014/0192460 A1* | 7/2014 | Sung | G06F 1/162 361/679.01 |
| 2015/0212546 A1* | 7/2015 | Ram | G06F 1/1649 361/679.01 |
| 2015/0374118 A1* | 12/2015 | van Hooft | A45C 11/00 248/451 |
| 2016/0069508 A1* | 3/2016 | Haymond | F16M 11/38 29/857 |
| 2016/0085271 A1* | 3/2016 | Morrison | G06F 1/1652 361/679.27 |
| 2016/0154428 A1* | 6/2016 | Senatori | G06F 1/1616 361/679.27 |
| 2017/0231102 A1* | 8/2017 | Truong | G06F 1/16 |
| 2019/0004568 A1* | 1/2019 | Kaya | G06F 1/1647 |
| 2019/0346080 A1* | 11/2019 | Wang | F16M 11/045 |
| 2020/0319674 A1* | 10/2020 | Knoppert | G06F 1/26 |

* cited by examiner

DISPLAY DEVICE STAND

TECHNICAL FIELD

Subject matter disclosed herein generally relates to stands for computing and display devices.

BACKGROUND

A device can include a housing with a display or housings coupled via one or more hinge assemblies where one or more of the housings can include a display.

SUMMARY

A display device stand can include a base that includes a fore portion with an upwardly sloping top surface defined by a first angle, an extension with an upwardly sloping fore surface defined by a second angle that is less than the first angle, and an aft portion, where the fore portion includes a front edge, the aft portion includes a back edge and the extension includes a top side that define vertexes of an acute triangle; and an adjustable support that includes a retracted state with respect to the extension and an extended state with respect to the extension. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
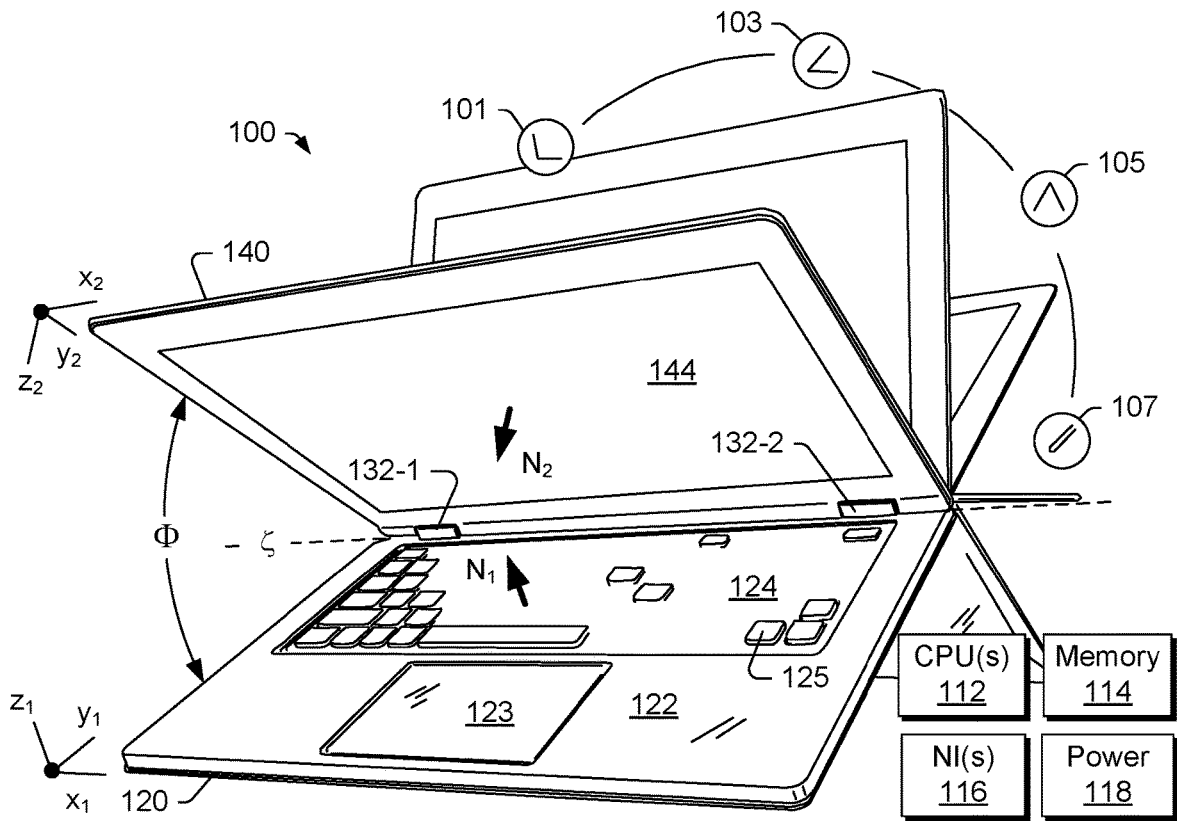
FIG. 1 is a series of diagrams of examples of devices.
Figure 1:
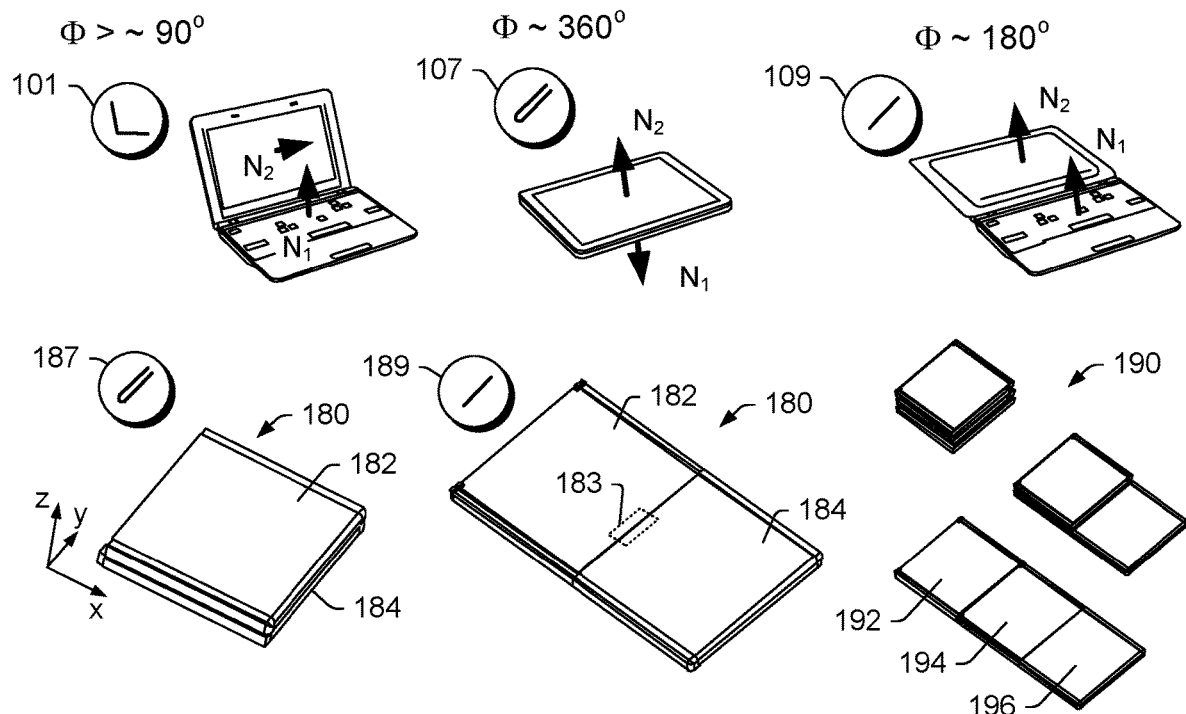

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

As explained with respect to FIG. 1, a computing device can include two or more displays. For example, a dual-screen computer can include a first touch-sensitive display and a second touch-sensitive display where each of the displays may be mounted to a respective housing where the housings are operatively coupled via one or more hinge assemblies.

Multiscreen or multi-display computing devices can provide configurations that have different display orientations, which can include angled, planar, etc. For example, in a tablet orientation, a single display may be viewable; whereas, in a flat, planar (e.g., 180 degree orientation) multiple displays may be viewable with an overall impression of a substantially continuous single display surface, for example, depending on gap size, etc., between housings of each of the displays, etc. In yet another orientation, an angle may exist between two displays that is greater than approximately 60 degrees and less than approximately 180 degrees where one display is positioned at a higher elevation than the other display and at a more upright angle than the other display. In such an example, the lower display may be utilized for one or more purposes such as drawing, navigating, etc., while the upper display may be utilized for one or more purposes, which can include rendering imagery, a drawing, etc. For example, a lower display may be an input display while the upper display is an output display that renders creative works responsive to input via the input display (e.g., drawing, painting, photo-editing, etc.).

As an example, a lower display may be at an angle that is ergonomic for stylus-based input, resting a hand while drawing, etc. For example, consider an angle that may be greater than approximately 10 degrees and less than approximately 80 degrees while, for example, an upper display may be at an angle that is greater than approximately 80 degrees and less than approximately 180 degrees.

As an example, in a planar, 180 degree orientation of a two display device, the device may be oriented with a hinge axis horizontal or with a hinge axis vertical. In the hinge axis horizontal (HAH) orientation, the height of the sum of the displays (e.g., effective display area) can be greater than the width; whereas, in the hinge axis vertical (HAV) orientation, the width of the sum of the displays (e.g., effective display area) can be greater than the height. As to HAV, it can be defined as a hinge axis having a component that can be extending along an axis defined by gravity (G). For example, a HAV orientation can be tilted or sloped such that the hinge axis can be defined by a vector having a component along an axis defined by gravity (G).

As an example, a stand can be utilized for supporting a multi-display device in one or more orientations. For example, such a stand may support a multi-display device with displays side by side or one over the other. As an example, a stand can include features that can provide for adjusting a support. For example, consider a support with a horizontal surface that can be raised or lowered to support an edge of at least one housing of a multi-display device. In such an example, ergonomics can be improved, for example, consider a better viewing angle, which may improve user posture.

As an example, a dual screen device may be somewhat smaller than a notebook computer given that the dual screens can be utilized to achieve an effective display area that may be greater than that of a notebook computer. For example, consider a notebook computer such as the computer 100 of FIG. 1 where the keyboard housing 120 has a keyboard and no display and where the display housing 140 has a display with a diagonal measure of approximately 15 inches (e.g., a "15 inch" notebook or laptop computer or a "40 cm" notebook or laptop computer). In such an example, the of the computer may have a height of approximately 0.9 in (e.g., 23 mm), a width of approximately 15 in (e.g., 380 mm) and a depth of approximately 10 in (e.g., 258 mm). If such a computer had two displays, the total display area may be approximately 15 in×20 in (e.g., or 20 in×15 in), which equates to an approximately 25 inch diagonal display, which may be larger than demanded for various mobile types of use cases. For example, a user may trade-off size for mobility such that an 18 inch diagonal is suitable, which can equate to a smaller footprint and an overall lighter device; noting that an 18 inch diagonal is larger than the single display of the aforementioned "15 inch" notebook computer.

As an example, a multi-display device may be configured to have a certain ratio in a side-by-side orientation such as, for example, 16:9.

As explained, a dual screen device can provide two different viewing positions. As an example, device may have a single display (e.g., a single screen) that is foldable (e.g., consider a single OLED display that is foldable, etc.). For example, consider a display that can fold in half and reduce its width by approximately 50 percent. In such an example, the device, if rectangular when open in a planar 180 degree orientation, can be oriented in a landscape mode or portrait mode, which may correspond to the aforementioned HAV and HAH orientations, respectively.

As an example, a device can include a continuous foldable display or multiple displays, each with its own housing. As an example, portions or housings can be folded on top of each other or extended, for example, in a 180 degree planar orientation. As an example, portions or housing can be of approximately the same size and active, optionally for touch input (e.g., stylus, finger, etc.).

As an example, a user may be seated at a table, a desk, a counter and be able to adjust orientation, height, etc., without getting up from the seated position. In such an example, a user may perform one or more workflows with one or more orientations.

As an example, a stand can include sloped surfaces, which can include a first surface that is at a lesser angle than a second surface, where the second surface is more upright than the first surface. As an example, the second surface can be adjustable. For example, the second surface can include a groove that can support at least a portion of a mass of a device where the groove is oriented horizontally and can be raised as to its vertical distance with respect to the first surface. As an example, a stand can provide for a support surface that allows for a dual screen device to (1) sit side by side, (2) be vertical with one screen on top of the other, (3) be raised in side by side position for better ergonomic viewing, and (4) be in a drawing mode with one screen angled down from the other.

As an example, a stand can optionally include circuitry. For example, consider a stand without circuitry that may be augmented by receiving circuitry. As to circuitry, consider a connector and power supply integrated in the stand for charging a dual screen device. As another example, consider charging circuitry and extra ports (e.g., to function as a dock).

As an example, a stand can be of a form that is at least in part functional, for example, where a vertical protruding geometry is associated with a height adjustable stand (e.g., a feature that may be "hidden" until used). As an example, a form can include a horizontal rear protruding geometry associated with a support leg and partial gusset to stabilize a dual screen device, particularly in a vertical/portrait orientation (e.g., where a hinge axis is horizontal).

As an example, a vertical geometry portion of a stand with height adjustment may be adjustable for a storage orientation, for example, consider a hinge that can allow for pivoting back so the unit is thinner for travel and a smaller package for shipping.

As an example, where a keyboard is an accessory, in various orientations, a stand may support the keyboard (e.g., a keyboard in a keyboard housing).

Figure 2:
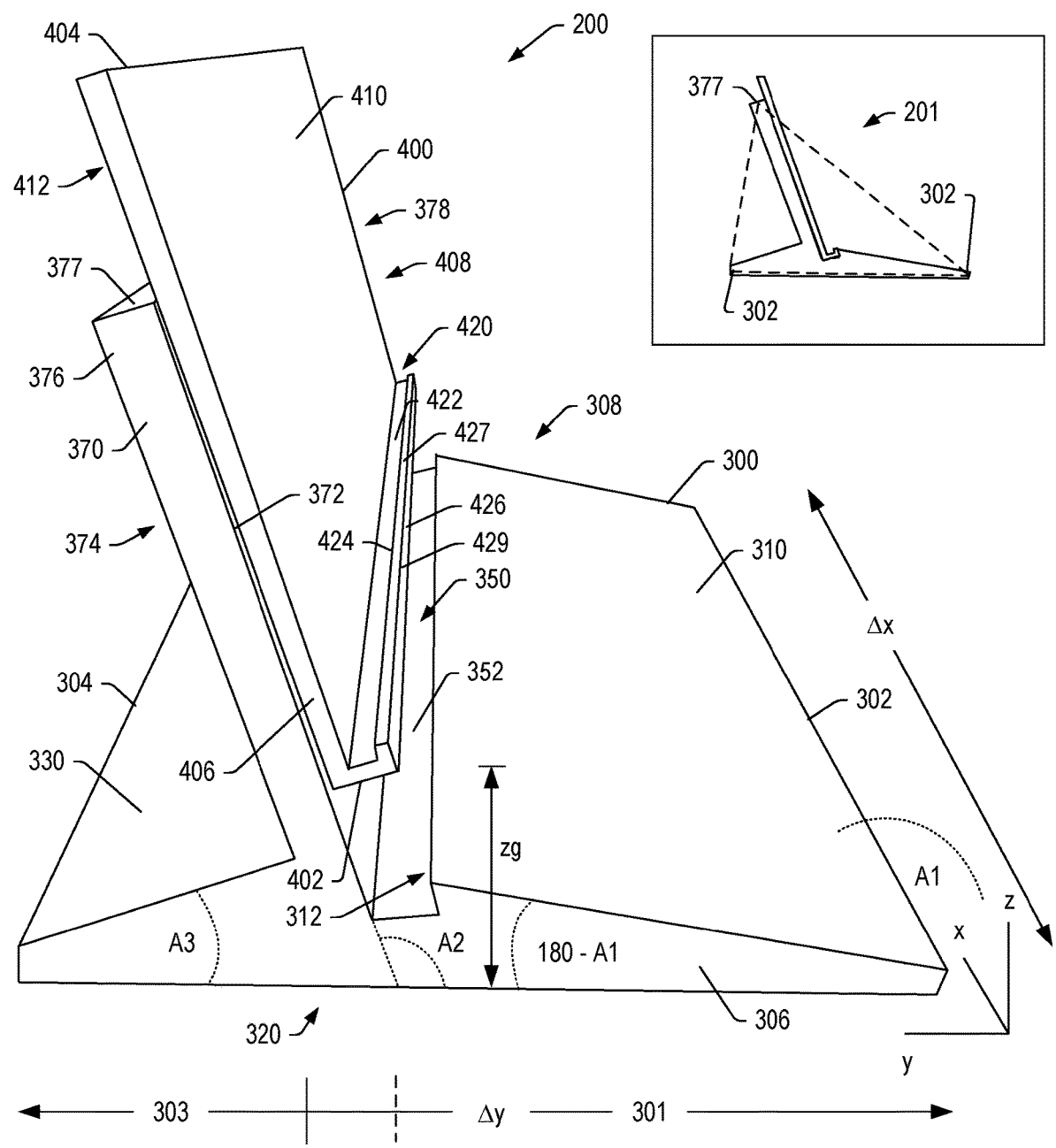
FIG. 2 is a perspective view of an example of a display device stand.

FIG. 2 shows an example of a stand 200 that includes a base 300 and an adjustable support 400. FIG. 2 also shows a Cartesian coordinate system with x, y and z axes. As an example, a fore portion 301 and an aft portion 303 may be defined with respect to dimensions along the y-axis (e.g., within the length Δy). As shown, the base 300 includes a front edge 302, a back edge 304, opposing sides 306 and 308, an upwardly sloping surface 310 that slopes upwardly in a direction away from the front edge 302 (e.g., slope in the y,z-plane), a downwardly sloping surface 330 that slopes downwardly in a direction toward the back edge 304 (e.g., slope in the y,z-plane), an extension 370 that extends upwardly (e.g., in a direction with a component along the z-axis) from a position that is between the front edge 302 and the back edge 304, and a slot 350 that is disposed in front of the extension 370, between the extension 370 and the upwardly sloping surface 310.

As shown in the example of FIG. 2, the extension includes a front side 372, a back side 374, opposing lateral sides 376 and 378, and a top side 377. As shown in the example of FIG. 2, the slot 350 of the base 300 is defined by the front side 372 of the extension 370, a surface 312 that is aft of the upwardly sloping surface 310, which may be vertical and/or sloped, and a surface 352, which may be horizontal and/or sloped. As shown, the slot 350 is defined by three surfaces 312, 352 and 372 (e.g., a lower portion of the front side 372 of the extension 370). In the example of FIG. 2, the slot 350 can have a substantially U-shaped profile (e.g., in the y,z-plane).

As to the adjustable support 400, it includes a bottom side 402, a top side 404, opposing lateral sides 406 and 408, a front side 410, a back side 412 and a groove 420 formed in part by a front lip 426. As shown, the groove 420 is defined in part by the front side 410 (e.g., a lower portion of the front side 410), a surface 422 and a surface 424 of the front lip 426. As shown, the front lip 426 can include a top surface 427 and a front surface 429. In the example of FIG. 2, the groove 420 can have a substantially U-shaped profile (e.g., in the y,z-plane) where the substantially U-shaped profile can be defined by a portion of the front side 410, the surface 422, and the surface 424.

In the example of FIG. 2, angles A1, A2 and A3 are shown, which can characterize the upwardly sloping surface 310 (see, e.g., 180 degrees minus A1), the downwardly sloping surface 330 (A3) and the extension 370 (A2). In moving along a direction of the y-axis, in the y,z-plane, the stand 200 includes a first upward slope defined by the angle A1 (e.g., as part of the fore portion 301), a second, greater upward slope defined by the angle A2 (e.g., an angle less than the angle A1 and part of the extension 370) and a downward slope defined by the angle A3 (e.g., as a part of the aft portion 303). As shown, the bottom side 320 of the base 200 can be horizontal and, for example, utilized as a reference for measuring one or more angles such as, for example, one or more of the angles A1, A2 and A3. As to other angles, the slot 350 may be defined by one or more angles and the groove 420 may be defined by one or more angles. As shown in the example of FIG. 2, the back side 412 of the adjustable support 400 can be substantially parallel to the front side 372 of the extension 370. In such an example, both the front side 372 and the back side 412 may be defined by the angle A2.

As an example, the angle A1 may be approximately 170 degrees and the angle A2 may be approximately 110 degrees such that A1 minus A2 is approximately 60 degrees. For example, given the angle A1, the angle A2 may be determined by subtracting an angle in the range of approximately 30 degrees to approximately 79 degrees. At a maximum, the angle A1 may be approximately 179 degrees such that the angle A2 is greater than approximately 90 degrees and, for example, less than approximately 150 degrees. As to the angle A3, it may be approximately 18 degrees in the example of FIG. 2; noting that it may be in a range from approximately 0 degrees to approximately 90 degrees (e.g., such that the aft portion extends upwardly, which may be vertically, for example, to meet the extension 370).

In the example of FIG. 2, an inset view 201 shows a side view of the stand 200 with respect to vertexes and legs of a triangle. In such an example, the triangle is not an obtuse triangle; rather, it is a right triangle or an acute triangle (e.g., internal angles less than 90 degrees).

As an example, the stand 200 can be a display device stand where the base 300 can include a fore portion with the upwardly sloping top surface 310 defined by the angle A1, the extension 370 with an upwardly sloping fore surface (see, e.g., the front side 372) defined by the angle A2, which that is less than the angle A1, and an aft portion, where the fore portion includes the front edge 302, the aft portion includes the back edge 304 and the extension includes the top side 377 that define vertexes of an acute triangle; and where the stand 200 can include the adjustable support 400 that can be in a retracted state with respect to the extension 370 and an extended state with respect to the extension 370.

In the example of FIG. 2, the groove 420 can be defined by a groove height zg, which can be measured at least in part in a direction along the z-axis. As to adjustability of the adjustable support 400, it can be adjustable in a manner defined at least in part by the dimension zg. In the example of FIG. 2, the dimension zg can be at a minimum when the groove 420 is fully recessed (e.g., at a lowermost position) with respect to the slot 350 and can be at a maximum as defined by a coupling features that couple the adjustable support 400 to the base 300.

In the example of FIG. 2, the adjustable support 400 can be positioned such that the groove 420 is substantially within the slot 350. For example, the bottom side 402 can be seated against the surface 352 of the slot 350, which may defined a minimum zg value. In such an example, the front lip 426 can be even with the upwardly sloping surface 310 or at a level below it where the upwardly sloping surface 310 meet the surface 312. In such an example, the front lip 426 can be recessed in the slot 350 such that an object can be positioned on the upwardly sloping surface 310 in a manner where the object can be pushed back to contact the front side 410 of the adjustable support 400. For example, if the front lip 426 extended above the surface 310, it may act as a stop that limits the position of an object supported at least in part by the surface 310. In such an example, there may be dead-space, which may result in a larger overall footprint, volume, etc., of an assembly of a device and the stand 200.

In the example of FIG. 2, the stand 200 can be defined to have a footprint, which may be defined by an area of the base 300. For example, FIG. 2 shows dimensions Δy and Δx, which can be multiplied to define an area or footprint of the stand 200. As an example, the bottom side 320 of the base 300 can include one or more feet, optionally elastomeric or a combination of materials (e.g., plastic, metal, alloy, rubber, etc.). A foot or feet may provide sufficient friction such that the stand 200 does not readily slide when on a table, a desk, a counter, etc. As to stability, as mentioned, the aft portion of the base 300 can help to support the stand 200 when a device is supported at least in part by the groove 420 of the adjustable support 400. For example, the aft portion of the base 300, which is the portion aft of the extension 370, can help prevent tipping backwards. As to the fore portion of the base 300, it may be defined as the portion that is fore of the front side 372 of the extension 370. As explained, the upwardly sloped surface 310 may be sloped at an ergonomic angle, which can be an angle suitable for drawing (e.g., using a touch display, a digitizer tablet, etc.).

As mentioned, a stand can include an extension that is positionable. For example, the extension 370 may be hinged such that it can fold backwardly and/or forwardly to a storage position (e.g., to minimize volume of the stand 200 when not in use). As an example, the extension 370 may be removable, optionally with the adjustable support 400 such that they may be stored together. For example, consider the bottom side 320 as including one or more features that can be utilized to attach the extension 370 (e.g., and the adjustable support 400) in a removed state. Such an approach may utilize one or more magnets, one or more latches, etc.

Figure 3:
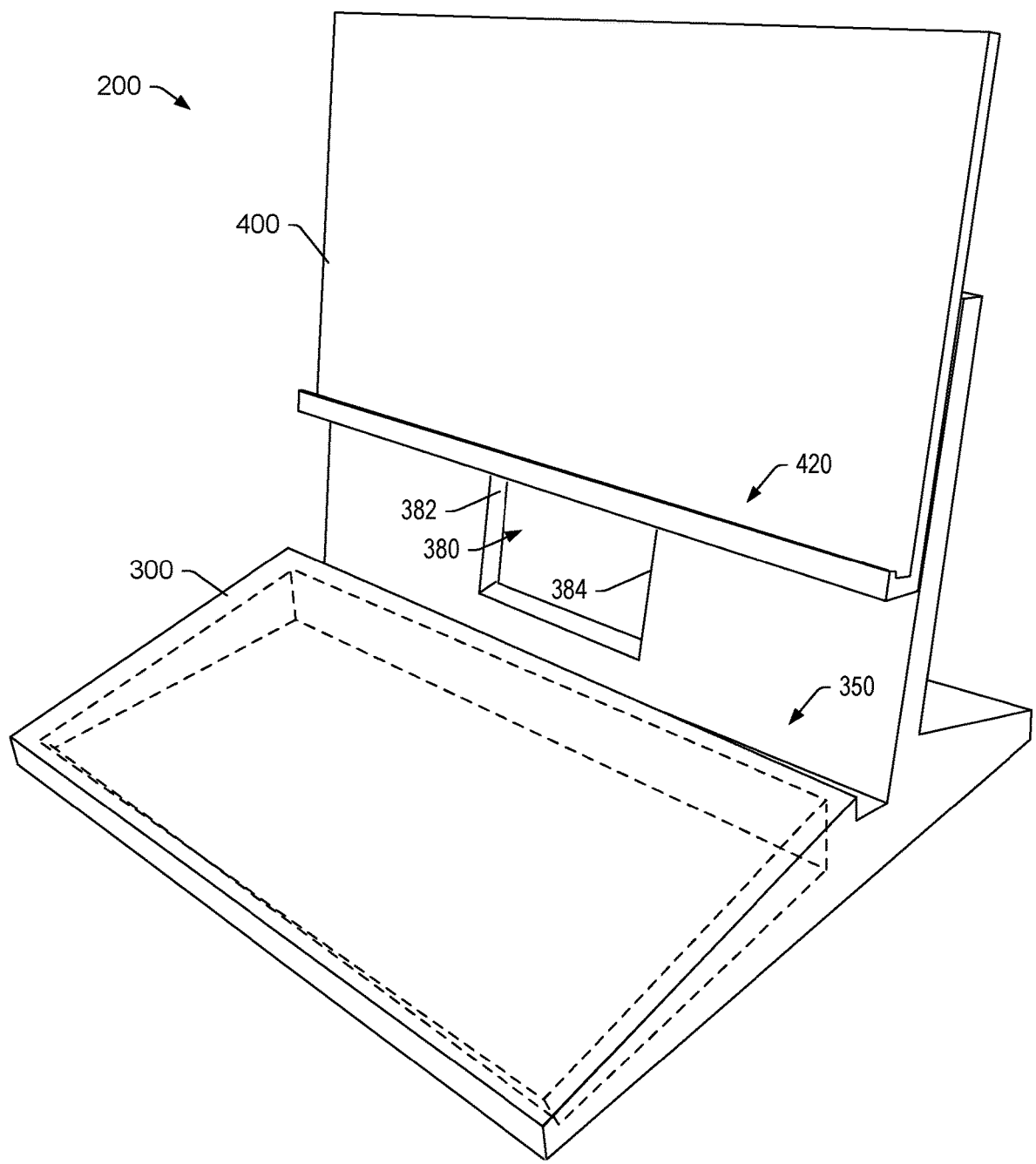
FIG. 3 is a perspective view of an example of a display device stand.

FIG. 3 shows a perspective view of an example of the stand 200 of FIG. 2 where a recess 380 of the extension 370 is visible. As shown, the stand 200 may include one or more compartments, which may be utilized, for example, for storage of one or more items. For example, a compartment may be accessible via a lid, a hatch, an opening, etc. While the compartment shown is in the fore portion of the stand 200, a compartment or compartments may be in the aft portion of the stand 200, additionally or alternatively.

In the example of FIG. 3, the recess 380 can include side walls 382 and 384 that cooperate with features of the adjustable support 400 such that the adjustable support 400 can be securely positioned manually to a desired height (see, e.g., the dimension zg of FIG. 2). For example, the side walls 382 and 384 can include one or more rails, one or more slots, one or more magnets, etc., where the adjustable support 400 includes corresponding features that allow for height adjustment in a manner that can cause the groove 420 to be raised and secured, lowered and secured, etc. As to magnets, the side walls 382 and 384 may include magnetic material or ferromagnetic material where the adjustable support 400 may include ferromagnetic material or magnetic material. As to rails, consider telescoping rails that are operatively coupled to the adjustable support 400. As an example, rails can be akin to those of a drawer of a cabinet where friction may be sufficient to hold the adjustable support 400 at a desired position. As an example, a combination of rails and magnets may be utilized. As an example, a dowel and catch approach may be utilized where a dowel is attached to the adjustable support 400 and a series of catches are in the extension 370 such that the adjustable support 400 may be incrementally adjusted. As another example, the adjustable support 400 and/or the extension 370 may be indexed such that the adjustable support 400 can be positioned and re-positioned at a desired height. For example, consider notches where a nib can fit into one of the notches, consider nibs and a notch where notch can be fit with a nib, and/or consider a notches and nibs, which may be indexed to provide for various positions, optionally with multiple notches and multiple nibs mating (e.g., consider protrusions that fit into openings, bores, etc.).

Figure 4:
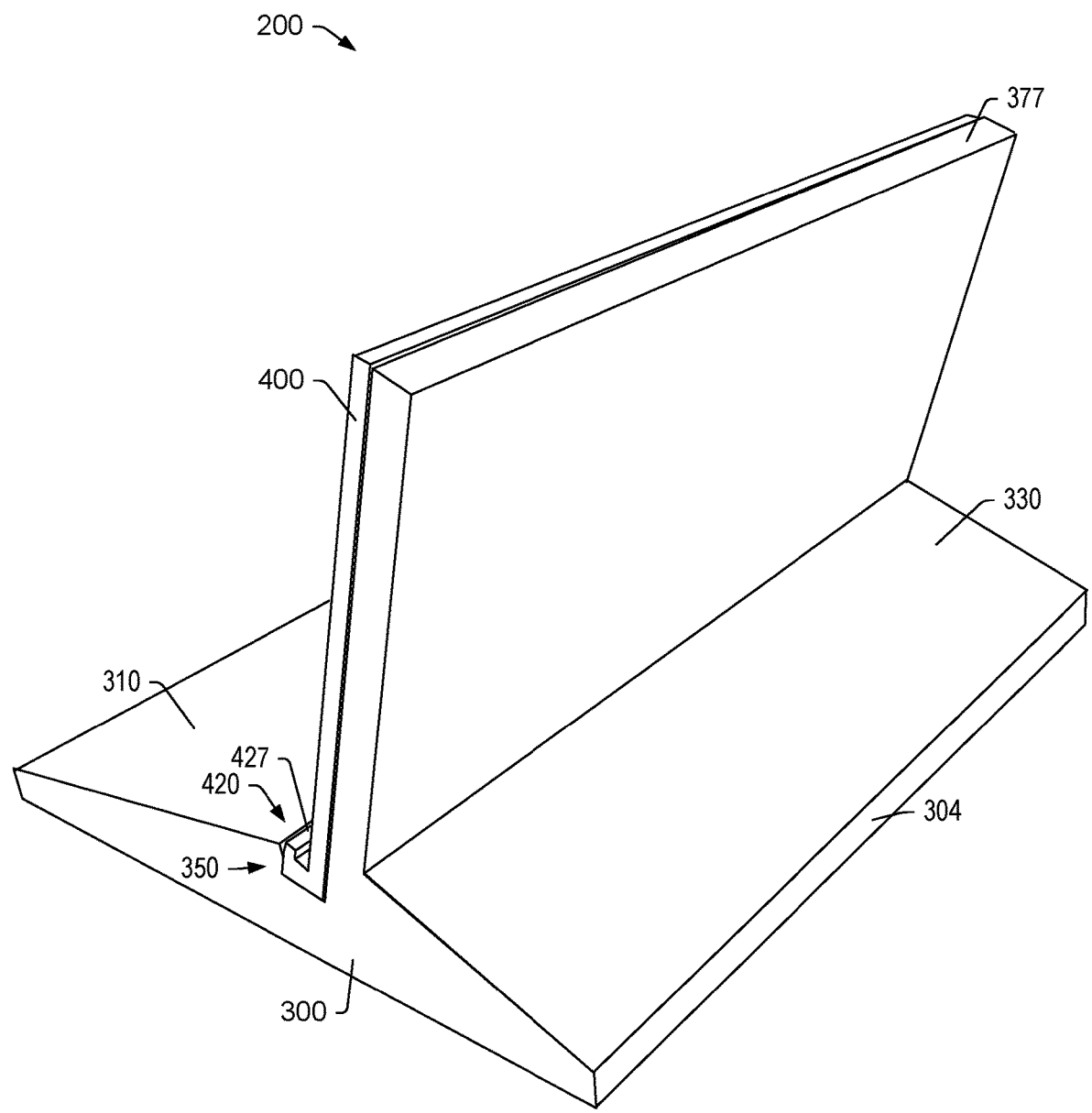
FIG. 4 is a perspective view of an example of a display device stand.

FIG. 4 shows a perspective view of an example of the stand 200 of FIG. 2 and FIG. 3 where the adjustable support 400 is at a minimum height (e.g., $zg_{min}$) as the groove 420 is seated within the slot 350 where the top surface 427 of the front lip 426 is at or below the upwardly sloping surface 310.

Figure 5:
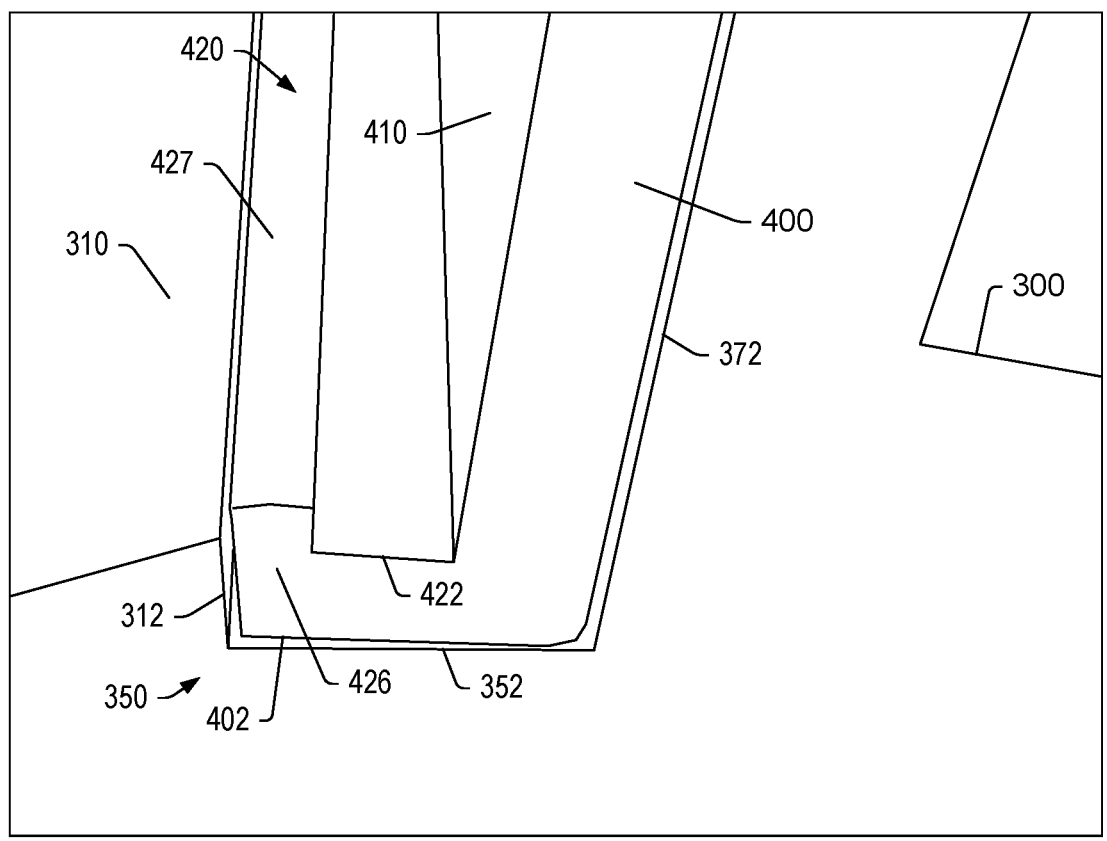
FIG. 5 is a perspective view of an example of a portion of a display device stand with an adjustable support in a retracted state.

FIG. 5 shows an enlarged view of a portion of an example of the stand 200, where the groove 420 is shown with respect to the slot 350 and the top surface 427 of the front lip 426. Also shown in the example of FIG. 5 are the bottom side 402, the front side 410, the surface 422, the surface 312, the surface 352 and the front side 372.

Figure 6:
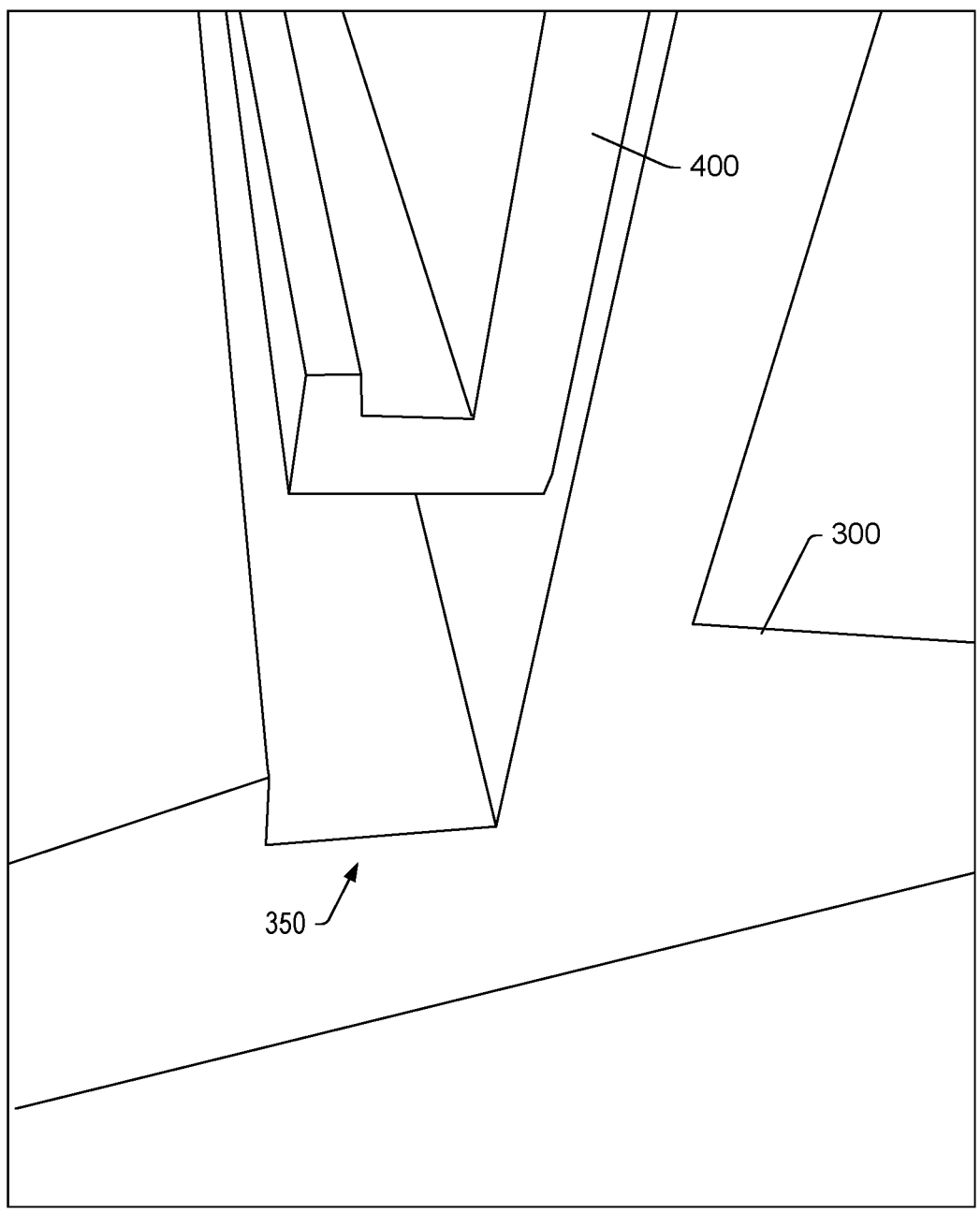
FIG. 6 is a perspective view of an example of a portion of a display device stand with an adjustable support in an extended state.

FIG. 6 shows an enlarged view of a portion of an example of the stand 200, where the adjustable support 400 is raised to a height such that it is not within the slot 350.

Figure 7:
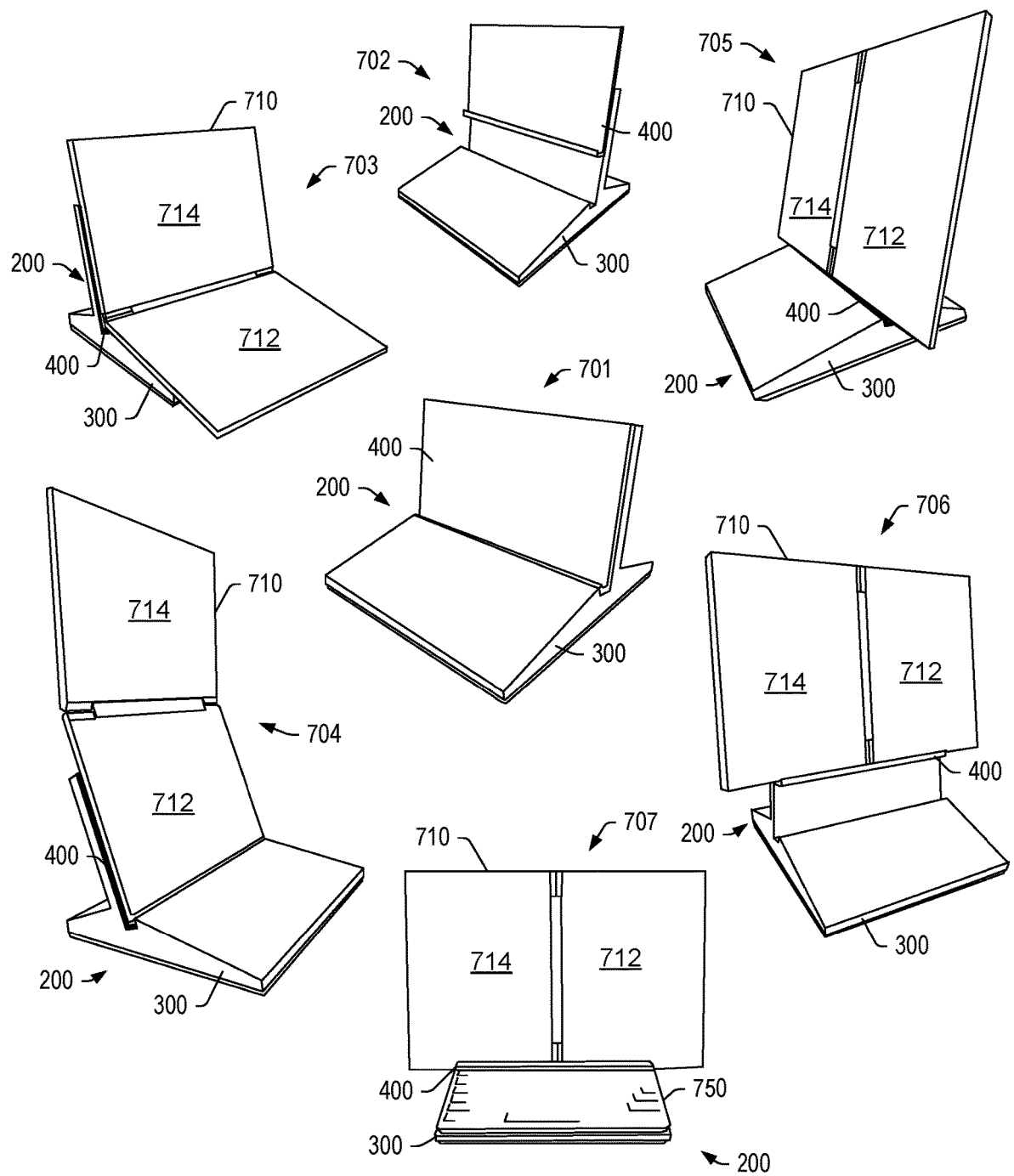
FIG. 7 is a series of perspective views of examples of orientations of an assembly that includes a display device stand and a display device.

FIG. 7 shows various example orientations of the stand 200 without a display device and with respect to a display device 710 that includes a display surface 712 and a display surface 714. In the examples of FIG. 7, the display device 710 is shows as including one or more hinges disposed between two housings; noting that a foldable display device can be utilized in one or more of such orientations.

The orientation 701 shows the adjustable support 400 in a seated state with respect to the base 300 where it is at a minimum height (see, e.g., zg). The orientation 702 shows the adjustable support 400 in an elevated state with respect to the base 300.

The orientation 703 shows the stand 200 with the adjustable support 400 in the seated state with the display device 710 in an angled orientation with the display surface 712 angled at an angle of the upwardly sloping surface 310 and the display surface 714 angled at an angle of the extension 370. In such an example, a front edge of the display device 710 may be in contact with a support surface such as that of a table, a desk, a counter, etc., which may help to prevent movement of the display device 710 with respect to the stand.

The orientation 704 shows the stand 200 with the adjustable support 400 in the seated state with the display device 710 being positioned with respect to the groove 420 of the adjustable support 400 (e.g., HAH). As shown, the display surface 712 is angled at an angle of the extension 370 and the display surface 714 is at a more vertical angle, which can be supported via hinge friction, etc. In such an example, the display surfaces 712 and 714 can be readily viewed by a user where the angle of each surface can be ergonomic with respect to a level of a user's eyes such that glancing at the display surface 712 and then the display surface 714 can be achieved by eye movement (e.g., optionally without movement of the user's head).

The orientation 705 shows the stand 200 with the adjustable support 400 in the seated state with the display device 710 being positioned with respect to the groove 420 of the adjustable support 400 (e.g., HAV). As shown, a portion of a first housing and a portion of a second housing of the display device 710 can be in contact with the groove 420 (e.g., one or more groove surfaces, etc.).

The orientation 706 shows the stand 200 with the adjustable support 400 in an elevated state such that a viewing angle for a user can be improved for viewing the display surface 712 and the display surface 714 of the display device 710. As mentioned, the aft portion of the stand 200 can provide for stability such that the stand 200 does not tip backwards. As shown, the stand 200 can include an aft portion of dimensions sufficient to steadily support the display device 710.

The orientation 707 shows the stand 200 with an accessory 750, which may be an input device that can be operatively coupled to the display device 710. For example, the accessory 750 can be a peripheral such as a keyboard, a digitizer tablet, etc., which can be supported by the stand 200 at an angle that may be determined by the upwardly sloping surface 310 of the base 300 of the stand. As an example, where a user desires a different viewing angle of one or both of the display surfaces 712 and 714, the user may re-orient the display device 710 and/or the adjustable support 400 of the stand 200.

As an example, where an adjustable support 400 is raised, the slot 350 may become available for use in another manner. For example, consider the slot 350 being used to position a smartphone, a stylus, etc. For example, in the orientation 706, an area exists below the adjustable support 400 where a smartphone may be positioned at least in part in the slot 350 such that a display of the smartphone is visible to a user along with the display surfaces 712 and 714.

As an example, a user may have a viewing zone that can be defined by limits such as an upper limit that corresponds to an angle of zero degrees and a lower limit that is measured downwardly from the upper limit. As an example, the viewing zone may have an optimal range of angles where, for example, the optimal range has a lower limit.

As an example, an optimal viewing angle for eyes may be defined according to the International Standards Organization (ISO ergonomics standards 9241-5). ISO 9241-5 states that an optimal viewing angle, or resting angle, is a −35 degree downward gaze angle from the horizon (e.g., at the level of the eyes). ISO 9241-5 also states that the optimal display placement is in a range of +/−15 degrees from the resting angle (e.g., −20 degrees to −50 degrees). Using the ISO 9241-5, a display surface may be optimally placed to be in a range of −20 degrees to −50 degrees relative to the horizon. The ISO 9241-5 range tends to be a bit lower than most users are accustomed for computer work, but is near a "normal" reading position as used by humans for many years. In this "normal" reading position, a display surface may be more appropriately called chest-height rather than head-height.

As to specific upper and lower limits of ISO 9241-5, it allows for a 0 degree horizontal gaze down to a −60 degrees gaze angle; noting that the lower limit of −60 degree angle may result in some amount of neck strain.

Figure 8:
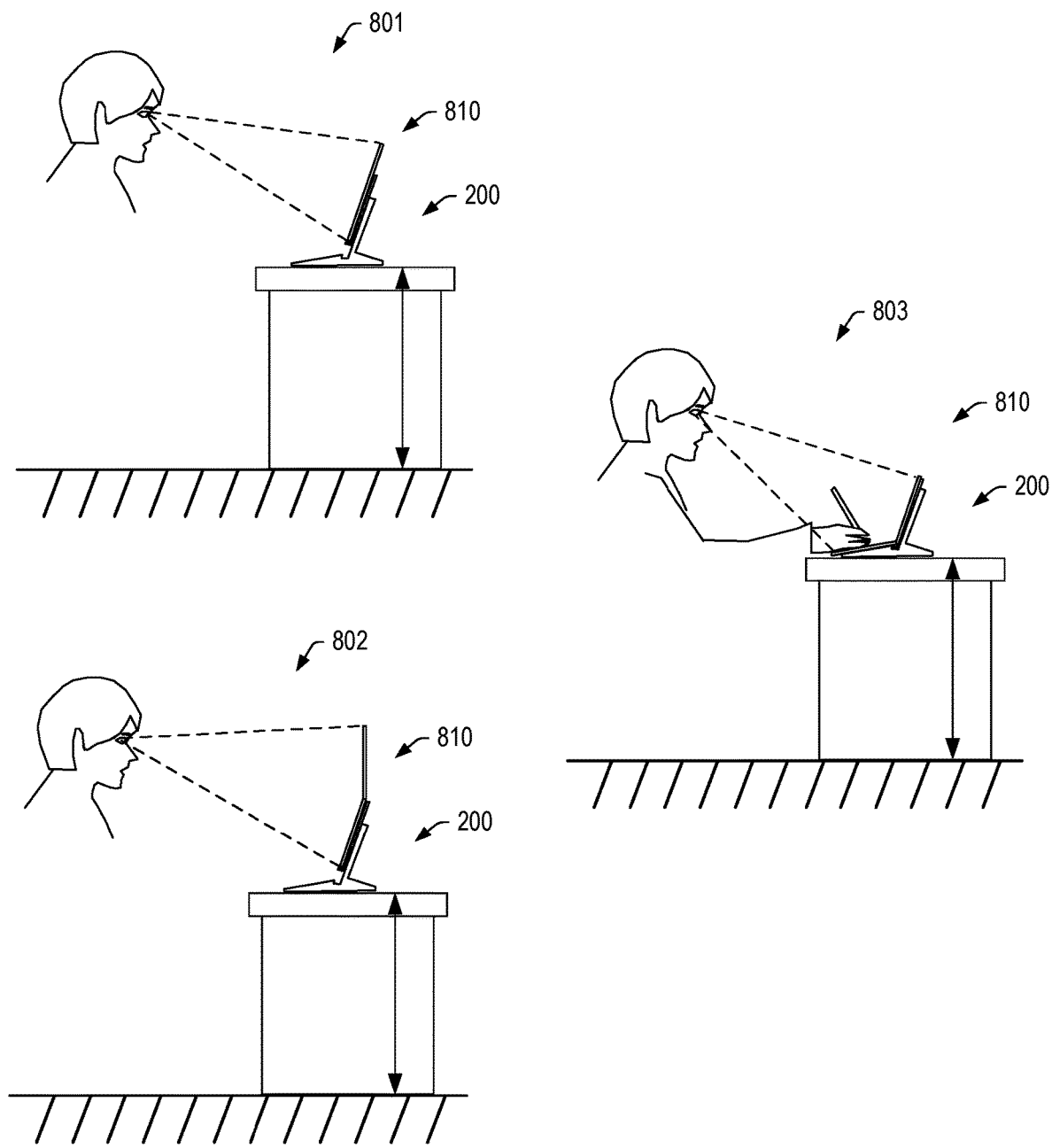
FIG. 8 is a series of side views of examples of scenarios with an example of an assembly in different example orientations.

FIG. 8 shows approximate side views of various scenarios 801, 802 and 803 where a user is viewing one or more displays of a device 810 supported at least in part by the stand 200. As shown, in the scenario 801, the device 810 and stand 200 can be an assembly that is supported on a surface with an associated viewing angle. In the scenario 802, the user has enlarged the viewing angle with respect to vertical height where one or more displays (e.g., display surface or surfaces) can be in different planes at different angles. In the scenario 803, the user can touch a portion of the device 810 as supported at least in part by the stand 200. For example, consider a stylus where the user handles a stylus to draw onto a portion of the device 810 (e.g., a display portion, etc.). Various scenarios of FIG. 8 can be related to one or more of the orientations of FIG. 7.

Figure 9:
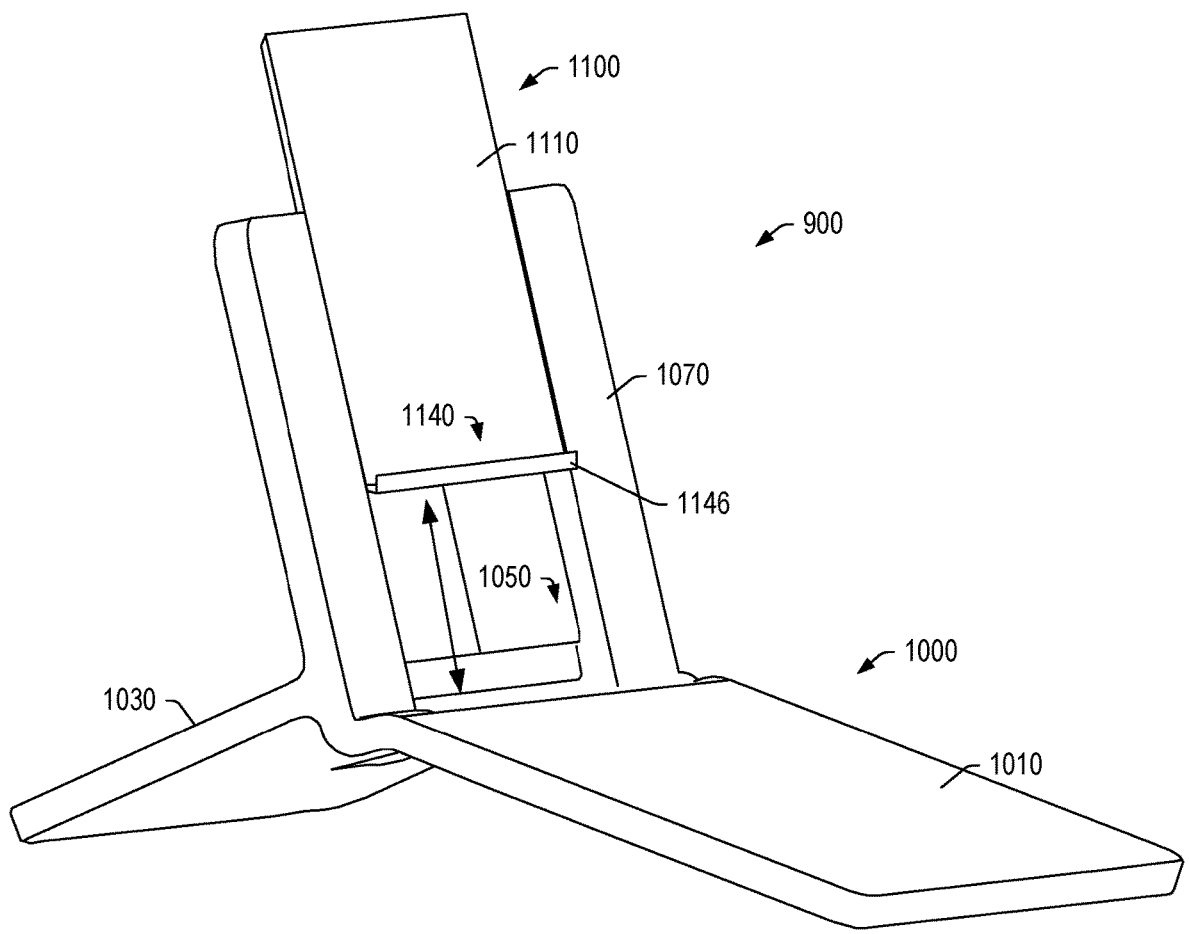
FIG. 9 is a perspective view of an example of a display device stand.

FIG. 9 shows an example of a stand 900 that includes a base 1000 and an adjustable support 1100. As shown, the base 1000 includes an upwardly sloping surface 1010 and a downwardly sloping surface 1030 along with an extension 1070 that is upwardly sloping at a greater slope than the surface 1010. In comparison to the stand 200, the stand 900 can include various features of the stand 200 (e.g., sides, surfaces, etc.); however, the stand 900 can be of lesser volume and/or of a different type of manufacture. For example, the base 1000 may be injection molded as a unitary piece of material (e.g., plastic, metal, alloy, etc.). In such an example, one or more finishing processes may be utilized (e.g., polishing, machining, etc.). As an example, the adjustable support 1100 can be made of the same material or of a different material than the base 1000. As an example, the adjustable support 1100 may be made of a plastic, a metal, an alloy, etc. As an example, the adjustable support 1100 may have a different color than the base 1000 such that a user is drawn to the adjustable support 1100 as being different, for example, a different component that has some utility and that may be adjustable for that utility. As an example, the base 1000 may be black and the support 1100 may be a color other than black.

As to adjustment of the adjustable support 1100, one or more of various technologies may be utilized, for example, consider those mentioned with respect to the example of FIG. 3 (e.g., friction, rails, magnets, nibs, notches, protrusions, openings, bores, etc.).

As an example, the adjustable support 1100 can include a groove 1140, which may be defined in part by a front lip 1146. In such an example, the front lip 1146 may differ in color from the other portions of the adjustable support 1100. For example, a front side 1110 of the adjustable support 1100 can be red where the front side 1110 can be covered when the adjustable support 1110 is supporting a display device and the front lip 1146 can be black or not red (e.g., a non-distracting color) as it may be visible in various orientations of the stand 900 when supporting a display device.

The various angles illustrated in FIG. 2 with respect to the stand 200 may similarly be utilized to characterize the stand 900 of FIG. 9. For example, the surface 1010 can be defined in part by the angle A1, the surface 1030 can be defined in part by the angle A3 and the extension 1170 can be defined in part by the angle A2. As an example, the groove 1140 can be positioned at a groove height (see, e.g., the dimension zg of FIG. 2), which may have a minimum height and a maximum height.

As shown in FIG. 9, the base 1000 can be formed with a recessed portion 1050, which may function akin to the slot 350 of the base 300. For example, at a minimum height of the adjustable support 1100, the front lip 1146 may be at a height that does not interfere with a device supported by the surface 1010.

Figure 10:
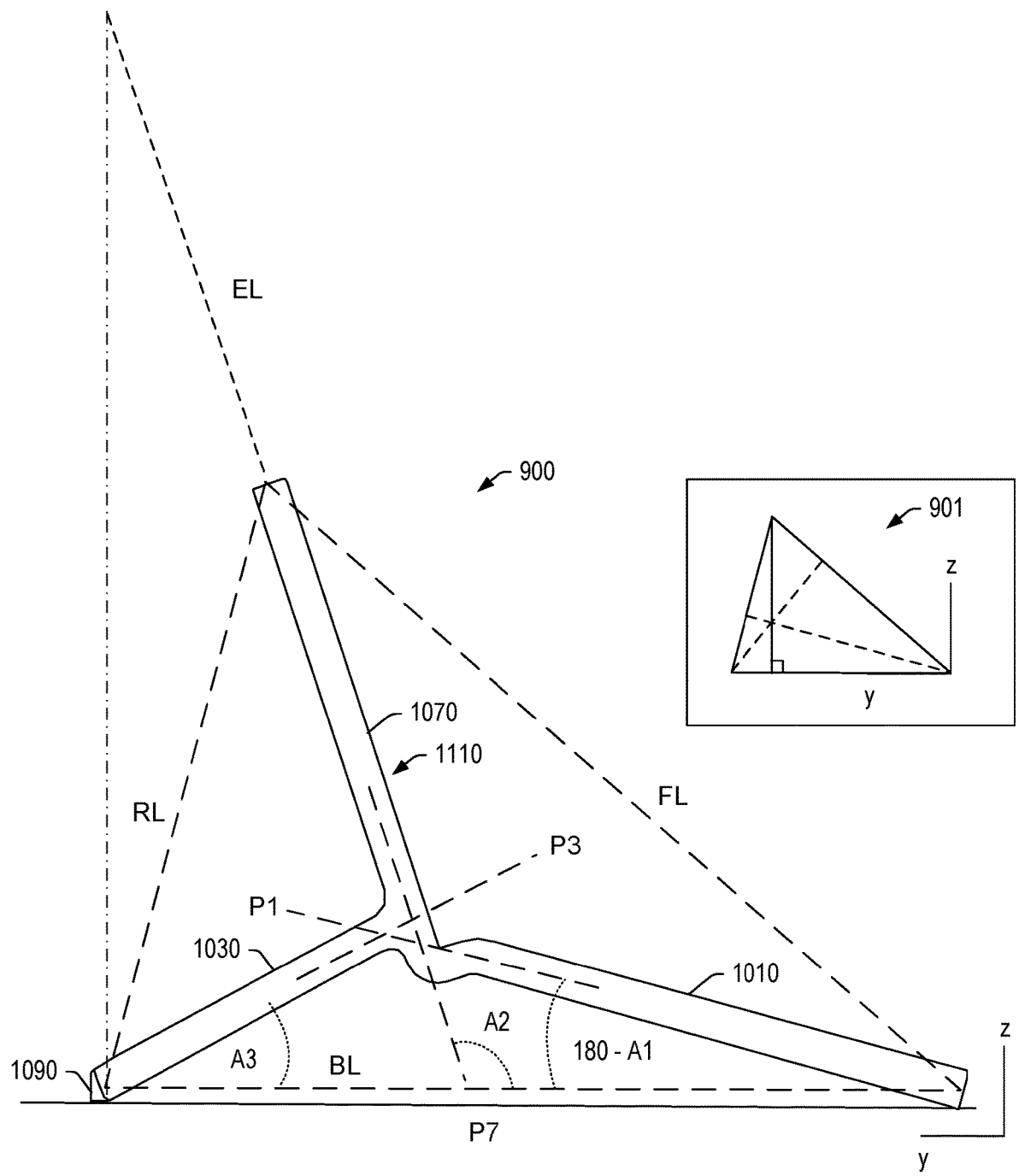
FIG. 10 is a side view of an example of a display device stand.

FIG. 10 shows a side view of the stand 900 of FIG. 9 with respect to y and z coordinates of the Cartesian coordinate system shown in FIG. 2. In the side view, the adjustable support 1110 may be hidden as it can be in a recessed state with respect to the base 1000. As shown, the stand 900 forms lines of contact that are separated by a distance measurable along the y-axis. As an example, the lines of contact (e.g., or points of contact) may run in the x-direction (e.g., into the page).

In the example of FIG. 10, various lines are illustrated, including plane lines P1, P3 and P7 and legs of a triangle, where the plane line P1 corresponds to a plane of the surface 1010 or parallel to the surface 1010, the plane line P3 corresponds to a plane of the surface 1030 or parallel to the surface 1030, and the plane line P7 corresponds to a plane of the extension 1070 (e.g., and/or the adjustable support 1100) and where legs can be a bottom leg (BL), a front leg (FL), and a rear leg (RL). As shown in FIG. 10, the legs can be defined by vertexes that are end points of various portions of the stand 900. As an example, the stand 200 can be defined utilizing similar plane lines, legs, vertexes, etc. FIG. 10 shows an inset view 901 with a triangle in the y,z-plane with a height in the z-direction indicated by a line that is normal to the base leg of the triangle (e.g., the bottom leg, BL). In the inset view 901, a point is indicated where lines intersect, which can be the intersection of the altitudes, which is the orthocenter. As shown, the orthocenter can differ from a region defined by intersection of the plane lines P1, P3 and P7, which are shown to form a small triangular region. In the inset view 901, the triangle is an oblique, acute triangle as the internal angles are less than 90 degrees. As an example, where the adjustable support 1110 is utilized to define a vertex, for example, at a maximum height of the adjustable support 1110 (e.g., $zg_{max}$), the type of triangle can differ (e.g., change). For example, the type of triangle may become a right triangle and then an oblique, obtuse triangle as the internal angle at the lower left between the legs BL and RL becomes greater than 90 degrees.

In the example of FIG. 10, the adjustable support 1110 can be of a length approximately equal to a length of the extension 1070. In such an example, if the adjustable support 1110 is extendable along a line EL, then a right triangle may be formed. As to the length of the adjustable support 1110 it may be approximately equal to or less than the length of the extension 1070; however, it may be extendable less than the length of the line EL such that a triangle formed when the adjustable support 1110 is at its maximum height (e.g., $zg_{max}$) is a right triangle or less or, for example, limited to being an acute triangle (e.g., not an obtuse triangle). In such an example, the aft portion of the base 1000 of the stand 900 can be assured to provide a desired amount of stability, without an overhang (e.g., a cantilever, etc.) of a component of the stand 900 extending further back than the backmost point of the aft portion of the base 1000.

In the example of FIG. 10, the angle A1 is approximately 160 degrees, the angle A2 is approximately 108 degrees and the angle A3 is approximately 30 degrees.

As an example, a stand can be defined by legs of a triangle and internal angles of a triangle. In such an example, as the stand can include an adjustable support, one vertex of the triangle can be adjustable such that it can be extended along a direction of a plane line. As explained, various features of a stand can be defined with respect to geometry associated with a triangle, which may facilitate mechanical static and/or dynamic calculations as to forces, stability, etc., particularly with respect to gravity (e.g., center of gravity of an assembly that includes a stand and a display device).

In the example of FIG. 10, the stand 900 includes a connector housing 1090 at the back, which may be suitable for connecting to power, data, data and power, etc., where, for example, the stand 900 includes circuitry.

Figure 11:
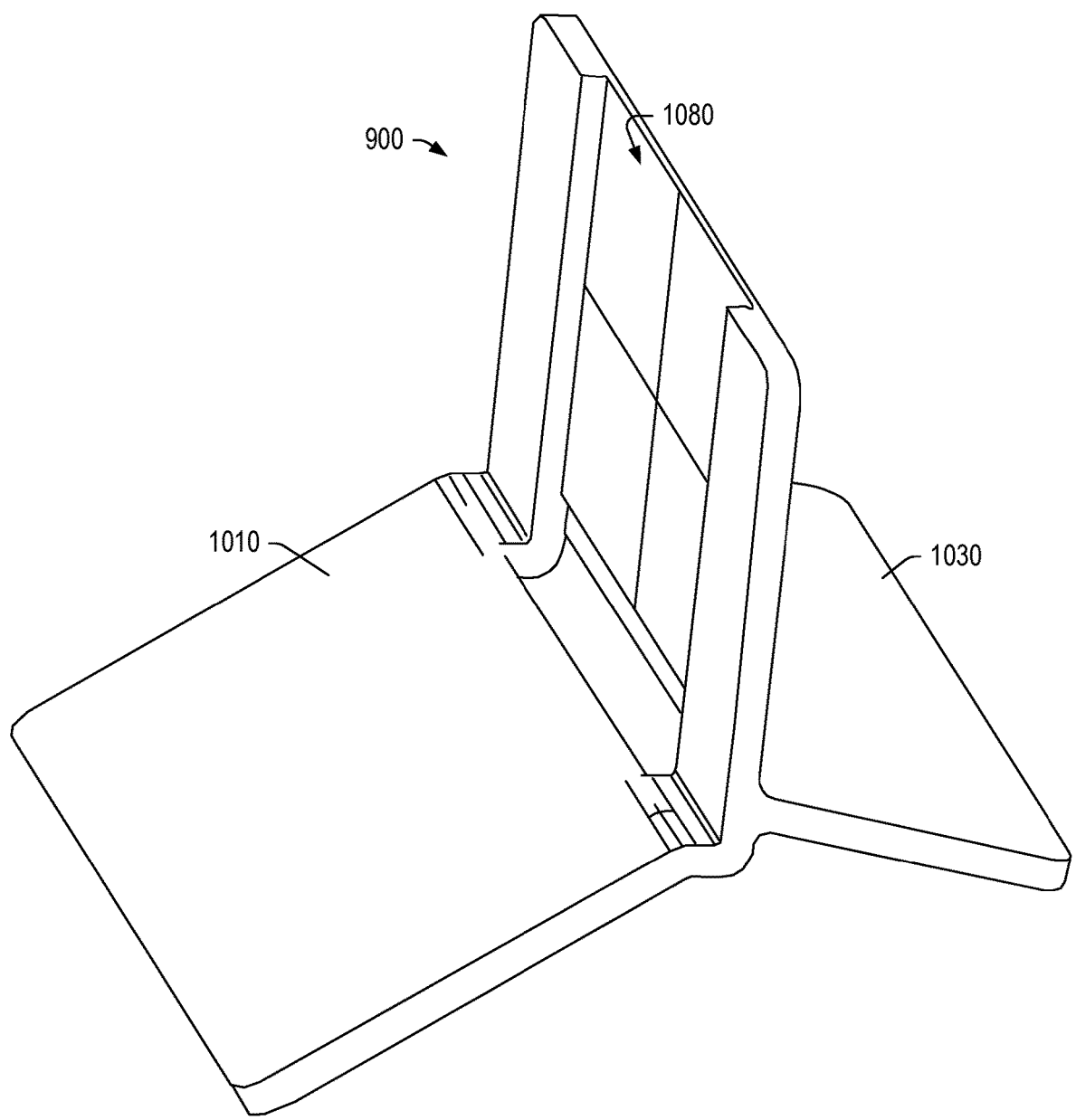
FIG. 11 is a perspective view of an example of a display device stand.

FIG. 11 shows a perspective view of an example of the stand 900 where a recessed portion 1080 is show, which can receive the adjustable support 1100 (e.g., or another suitable support, etc.). As shown, the extension 1070 can be formed with two uprights and a recess therebetween, which may include a back plate. As an example, the aft portion and/or the fore portion of the base 1000 can include one or more recesses, which may, for example, house circuitry. For example, the uprights may be contiguous with members that run through the aft and/or fore portions of the base 1000.

Figure 12:
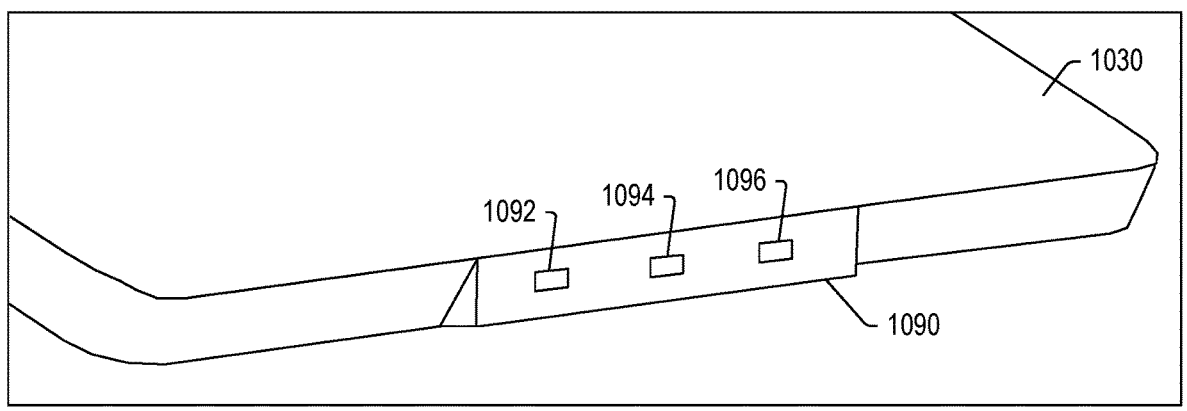
FIG. 12 is a perspective view of an example of a portion of a display device stand.

FIG. 12 shows an example of the stand 900 as including the connector housing 1090 with one or more connectors 1092, 1094 and 1096. As shown, the one or more connectors 1092, 1094 and 1096 can be oriented substantially horizontally, which may help to minimize stress in a cable, a connector, etc., and/or to provide for running cables close to a support surface.

As an example, a display device stand can include a base that includes a fore portion with an upwardly sloping top surface defined by a first angle, an extension with an upwardly sloping fore surface defined by a second angle that is less than the first angle, and an aft portion, where the fore portion includes a front edge, the aft portion includes a back edge and the extension includes a top side that define vertexes of an acute triangle; and an adjustable support for a display device that includes a retracted state with respect to the extension and an extended state with respect to the extension. In such an example, the display device stand can include a slot disposed between the upwardly sloping top surface of the fore portion and the extension. In such an example, the adjustable support, in the retracted state, can be disposed at least in part in the slot.

As an example, an adjustable support can include a front lip. For example, an adjustable support includes a groove, a front lip can define at least a portion of the groove. As an example, a front lip can be disposed at a lower side of an adjustable support. For example, to provide a substantially J-shaped profile to the adjustable support. As an example, a groove can have a fore to aft dimension that is less than approximately 1.5 cm and greater than approximately 0.3 cm. For example, a groove can be sufficiently sized to receive a mobile computing device, which can include multiple displays.

As an example, an extension of a display device stand can include a recess where an adjustable support is received at least in part in the recess. In such an example, the recess can be defined at least in part by side walls of the extension. As an example, such side walls of the extension can include one or more features for adjustment of the adjustable support. As an example, a recess can be positioned between lateral sides of an extension. For example, an extension can include members that define a recess therebetween where the members can provide structural support. As mentioned, one or more technologies may be utilized for positioning an adjustable support with respect to an extension.

As an example, a display device stand can include one or more magnetic materials and/or one or more ferromagnetic materials. As an example, a magnetic material can be a magnet, for example, where an adjustable support is maintained in an extended state via magnetic force of the magnet (e.g., in combination with another magnet (attraction) and/or ferromagnetic material).

As an example, a display device stand can include charging circuitry. As an example, a display device stand can include at least one electrical connector, which may be or include, for example, at least one serial bus connector.

As an example, a display device stand can include a base that is a unitary piece of material that defines at least a fore portion and an aft portion. As an example, a display device stand can include a base that is a unitary piece of material that defines a fore portion, an aft portion and an extension.

As an example, an assembly can include a display device; and a display device stand that includes an adjustable support for the display device, where the assembly includes a portrait orientation and a landscape orientation of the display device with respect to the display device stand. In such an example, the display device can include a first housing with a first display, a second housing with a second display, and a hinge assembly that couples the first housing pivotably to the second housing, where the hinge assembly includes a hinge axis for defining a pivot angle. In such an example, in the portrait orientation, the hinge axis can be horizontal and, in the landscape orientation, the hinge axis can be vertical.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 13:
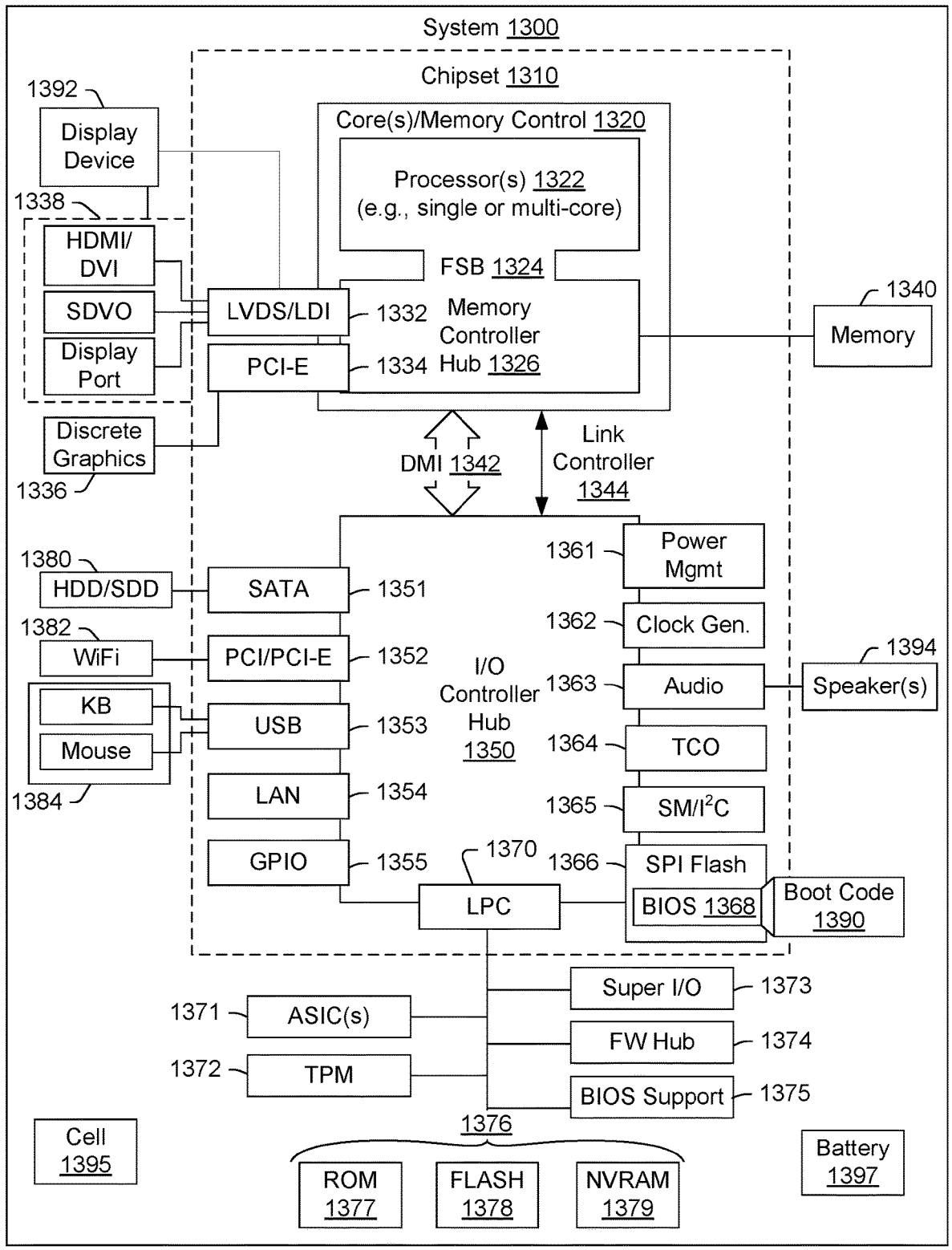
FIG. 13 is a diagram of an example of a system.

While various examples of circuits or circuitry have been discussed, FIG. 13 depicts a block diagram of an illustrative computer system 1300. The system 1300 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a display device or other machine may include other features or only some of the features of the system 1300. As an example, a display device stand may include one or more of the components illustrated in the computer system 1300. As explained, a display device stand may include circuitry, which may include one or more batteries (e.g., one or more lithium-ion batteries, etc.).

As an example, a monitor or display device may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 13, the system 1300 includes a so-called chipset 1310. A chipset refers to a group of integrated circuits, or chips, that are designed to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A display device stand for a display device foldable with respect to two display portions, the display device stand comprising:

a base that comprises a fore portion with an upwardly sloping top surface defined by a first angle, an extension with an upwardly sloping fore surface defined by a second angle that is less than the first angle, and an aft portion, wherein the fore portion comprises a front edge, the aft portion comprises a back edge and the extension comprises a top side that define vertexes of an acute triangle; and an adjustable support for a display device that comprises a retracted state with respect to the extension and an extended state with respect to the extension, wherein the extension comprises a recess, wherein the recess is positioned between lateral sides of the extension and wherein the adjustable support is received at least in part in the recess.

2. The display device stand of claim 1, comprising a slot disposed between the upwardly sloping top surface of the fore portion and the extension.

3. The display device stand of claim 2, wherein the adjustable support, in the retracted state, is disposed at least in part in the slot.

4. The display device stand of claim 1, wherein the adjustable support comprises a front lip.

5. The display device stand of claim 4, wherein the adjustable support comprises a groove wherein the front lip defines at least a portion of the groove.

6. The display device stand of claim 4, wherein the front lip is disposed at a lower side of the adjustable support.

7. The display device stand of claim 6, wherein the groove comprises a fore to aft dimension that is less than approximately 1.5 cm and greater than approximately 0.3 cm.

8. The display device stand of claim 1, wherein the recess is defined at least in part by side walls of the extension.

9. The display device stand of claim 1, comprising a magnet, wherein the adjustable support is maintained in the extended state via magnetic force of the magnet.

10. The display device stand of claim 1, comprising charging circuitry.

11. The display device stand of claim 1, comprising at least one electrical connector.

12. The display device stand of claim 11, wherein the at least one electrical connector comprises at least one serial bus connector.

13. The display device stand of claim 1, wherein the base comprises a unitary piece of material that defines at least the fore portion and the aft portion.

14. The display device stand of claim 1, wherein the base comprises a unitary piece of material that defines the fore portion, the aft portion and the extension.

15. The display device stand of claim 1 further comprising:

a display device foldable with respect to two display portions.

16. The display device stand of claim 15, wherein the display device comprises a first housing with a first one of the two display portions, a second housing with a second one of the two display portions, and a hinge assembly that couples the first housing pivotably to the second housing, wherein the hinge assembly comprises a hinge axis for defining a pivot angle.

17. The display device stand of claim 16, wherein, in the portrait orientation, the hinge axis is horizontal.

18. The display device stand of claim 16, wherein, in the landscape orientation, the hinge axis is vertical.

* * * * *